(12) United States Patent
Xiong et al.

(10) Patent No.: US 9,204,019 B2
(45) Date of Patent: Dec. 1, 2015

(54) MEASURING DEVICE AND METHOD FOR CALCULATING RESPONSE TIME OF ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yu-Kai Xiong, Shenzhen (CN); Xin Lu, Shenzhen (CN); Shih-Fang Wong, New Taipei (TW); Hui-Feng Liu, Shenzhen (CN); Dong-Sheng Lv, Shenzhen (CN); Xin-Hua Li, Shenzhen (CN); Yu-Yong Zhang, Shenzhen (CN); Jian-Jian Zhu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 272 days.

(21) Appl. No.: 13/798,186

(22) Filed: Mar. 13, 2013

(65) Prior Publication Data

US 2013/0242200 A1    Sep. 19, 2013

(30) Foreign Application Priority Data

Mar. 14, 2012  (CN) .......................... 2012 1 0066283

(51) Int. Cl.
*H04N 5/14* (2006.01)
*H04N 17/04* (2006.01)

(52) U.S. Cl.
CPC ............... *H04N 5/147* (2013.01); *H04N 17/04* (2013.01)

(58) Field of Classification Search
CPC ............................. H04N 5/147; H04N 17/04
USPC ......................................................... 348/700
See application file for complete search history.

(56) References Cited

U.S. PATENT DOCUMENTS

| 2003/0117131 | A1* | 6/2003  | Ham ............................. 324/160 |
| 2004/0263450 | A1* | 12/2004 | Lee et al. ......................... 345/87 |
| 2006/0139269 | A1* | 6/2006  | Takeshita et al. ............... 345/87 |
| 2007/0164776 | A1* | 7/2007  | Chang et al. ................... 324/770 |
| 2008/0082284 | A1* | 4/2008  | Carroll et al. ................. 702/109 |
| 2010/0066850 | A1* | 3/2010  | Wilson et al. .............. 348/222.1 |
| 2010/0067735 | A1* | 3/2010  | Braun et al. ................... 382/100 |
| 2013/0016207 | A1* | 1/2013  | Xiong et al. .................... 348/92 |

* cited by examiner

*Primary Examiner* — Jay Patel
*Assistant Examiner* — Francis G Geroleo
(74) *Attorney, Agent, or Firm* — Novak Druce Connolly Bove + Quigg LLP

(57) ABSTRACT

A method for calculating response time of an electronic device is provided. The method includes: obtaining a video file recording a process of change of interface displayed from an original interface to a new interface chosen by a user, the video file comprises a series of video frames; searching for a key video frame among all the video frames of the video file, the image of the key video frame indicates the point of demarcation between the original interface and the new interface displayed; and calculating a time interval from a first video frame of the video file to the key video frame, according to timestamps of the first video frame and of the key video frame, so as to determine the actual response time of the electronic device. A related measuring device is also provided.

6 Claims, 3 Drawing Sheets

MEASURING DEVICE AND METHOD FOR CALCULATING RESPONSE TIME OF ELECTRONIC DEVICE

BACKGROUND

1. Technical Field

The present disclosure relates to a measuring device and a method for calculating response time of an electronic device.

2. Description of Related Art

The performance of the electronic devices defines the device. Response time for operations on the electronic device is one of the most important aspects in the design and manufacture of electronic device, as the user experiences directly. However, existing methods for measuring performance, such as the response time of the electronic device are overly complex, and consume a lot of time.

Therefore, a measuring device and a method for calculating response time of an electronic device are needed.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
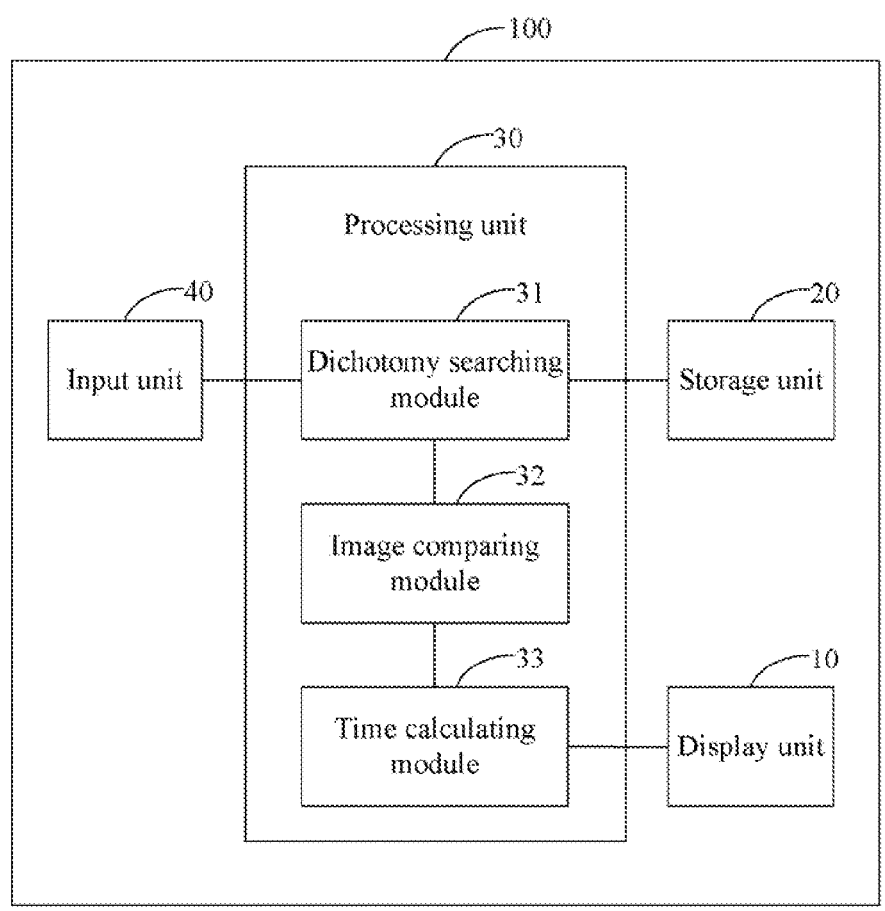
FIG. 1 is a block diagram of a measuring device, according to an embodiment.

Referring to FIG. 1, a measuring device 100 for calculating response time of an electronic device (not shown) being measured is illustrated. In a measuring process, a user operates the electronic device to turn on or turn off the electronic device or switch the interface displayed on the electronic device, in order to change the displayed interface of the electronic device from an original interface to a new interface (target interface) chosen by the user. The measuring device 100 obtains a video file recording a process of change of the interface displayed corresponding to user's operation.

In one embodiment, the measuring device 100 includes a camera unit (not shown) for recording the process of change of the displayed interface of the electronic device corresponding to user's operation, in order that the video file is generated. In an alternative embodiment, an external camera device (not shown) records the process of change of the displayed interface of the electronic device corresponding to user's operation to generate the video file, and the measuring device 100 communicates with the external camera device to obtain the video file.

Figure 2:
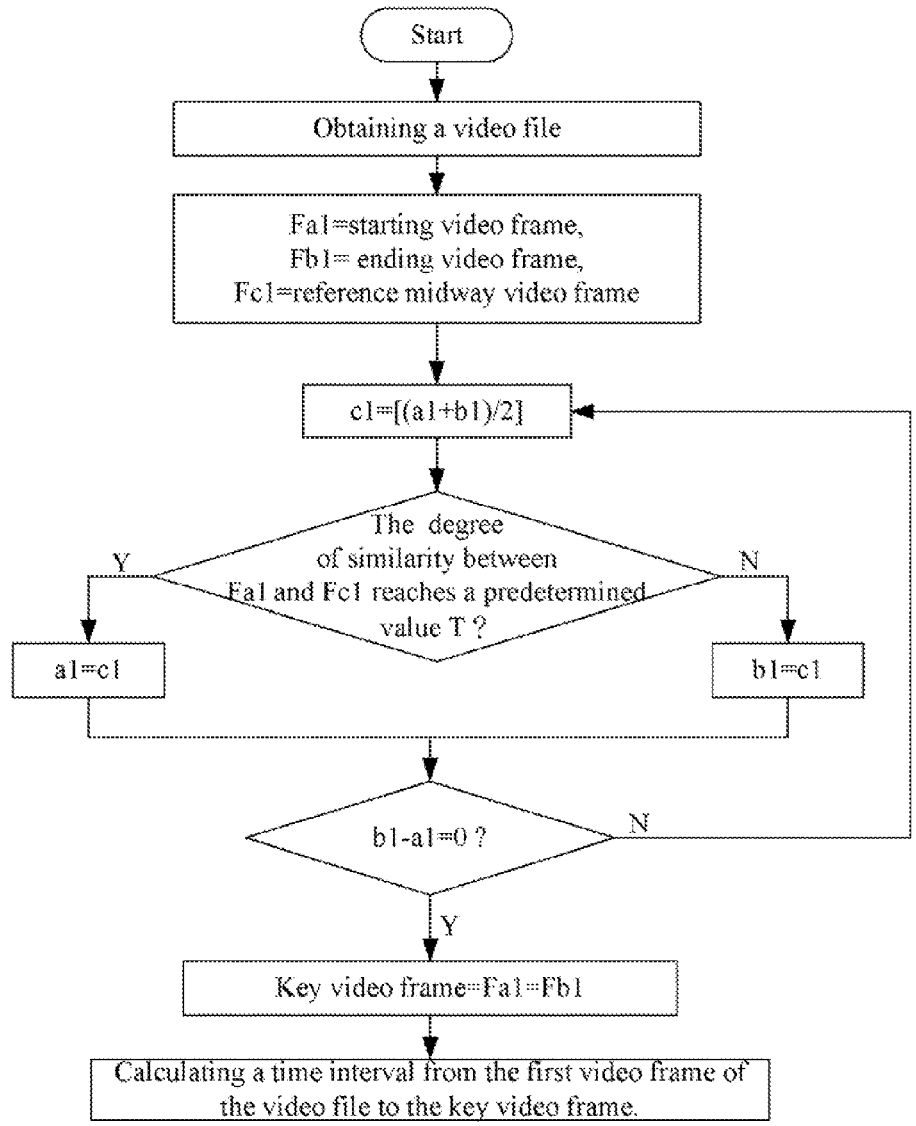
FIG. 2 is a flowchart illustrating an algorithm for calculating response time of an electronic device.

In the embodiment, the measuring device 100 includes a display unit 10, a storage unit 20, a processing unit 30, and an input unit 40. The storage unit 20 stores the obtained video file. Referring also to FIG. 2, the processing unit 30 reads the obtained video file according to an input command through the input unit 40, and searches for a key video frame among all the video frames of the obtained video file, and the image of the key video frame indicates the demarcation point between the original interface and the new interface displayed on the electronic device. The processing unit 30 further calculates a time interval from the first video frame of the video file to the key video frame, according to timestamps of the first video frame and of the key video frame, so as to determine the response time of the electronic device.

In the embodiment, the processing unit 30 includes a dichotomy searching module 31 and an image comparing module 32. The dichotomy searching module 31 is configured to search for reference midway video frames of the video file according to a dichotomy searching command input into the input unit 40.

Specifically, suppose that collection $V (=\{F1, F2, \ldots, Fn\})$ denotes the video file, Fi (where $i=1, 2, \ldots, n$) denotes the $i^{th}$ video frame of the video file, F1 denotes the first (the starting) video frame, Fn denotes the ending (the ending) video frame. Suppose a current searching scope is the collection $V=\{F1, F2, \ldots, Fn\}$, and suppose a first variable a1 denotes the serial number of the starting video frame, a second variable b1 denotes the serial number of the ending video frame, and a third variable c1 denotes the serial number of a reference midway video frame within the current searching scope, and the third variable c1 is calculated as follows: $c1=(a1+b1)/2$.

The image comparing module 32 compares the images of the starting video frame Fa1 and the reference midway video frame Fc1 of the current searching scope, and calculates the degree of similarity between them. In the embodiment, the dichotomy searching module 31 further determines a narrower searching scope within the current searching scope according to the degree of similarity.

In the embodiment, if the degree of similarity between the images from the starting video frame Fa1 and from the reference midway video frame Fc1 of the current searching scope $V=\{F1, F2, \ldots, Fn\}$ reaches a predetermined value T, the dichotomy searching module 31 determines the narrower searching scope as starting from the reference midway video frame Fc1 of the current searching scope and as far as the ending video frame Fn of the current searching scope, that is, the image comparing module 32 determines the reference midway video frame Fc1 of the current searching scope as being the starting video frame for the narrower searching scope, i.e. assigns the variable a1=c1, and thereby the narrower searching scope will be $V1=\{Fc1, F(c1+1), \ldots, Fn\}$; otherwise, the dichotomy searching module 31 determines the narrower searching scope as starting from the starting video frame Fa1 of the current searching scope and as far as the reference midway video frame Fc1 of the current searching scope, that is, the image comparing module 32 determines the reference midway video frame Fc1 of the current searching scope as being the ending video frame for the narrower searching scope, i.e., assigns the second variable b1=c1, and thereby the narrower searching scope will be $V1=\{F1, F2, \ldots, Fc1\}$. Then, the dichotomy searching module 31 goes on to search for the reference midway video frame in the narrower searching scope, the above process repeats until the starting video frame of a searching scope is the same as the ending video frame in the searching scope, that is, $b1-a1=0$. Thereby, the starting video frame and the ending video frame of the searching scope are determined as being identical to the key video frame.

The processing unit 30 further includes a time calculating module 33, the time calculating module 33 is configured for calculating the time interval from the first video frame of the video file to the key video frame, according to timestamps of the first video frame and of the key video frame. In the embodiment, the calculated time interval is the actual response time of the electronic device corresponding to user's operation, and the display unit 10 is configured for displaying the response time.

Figure 3:
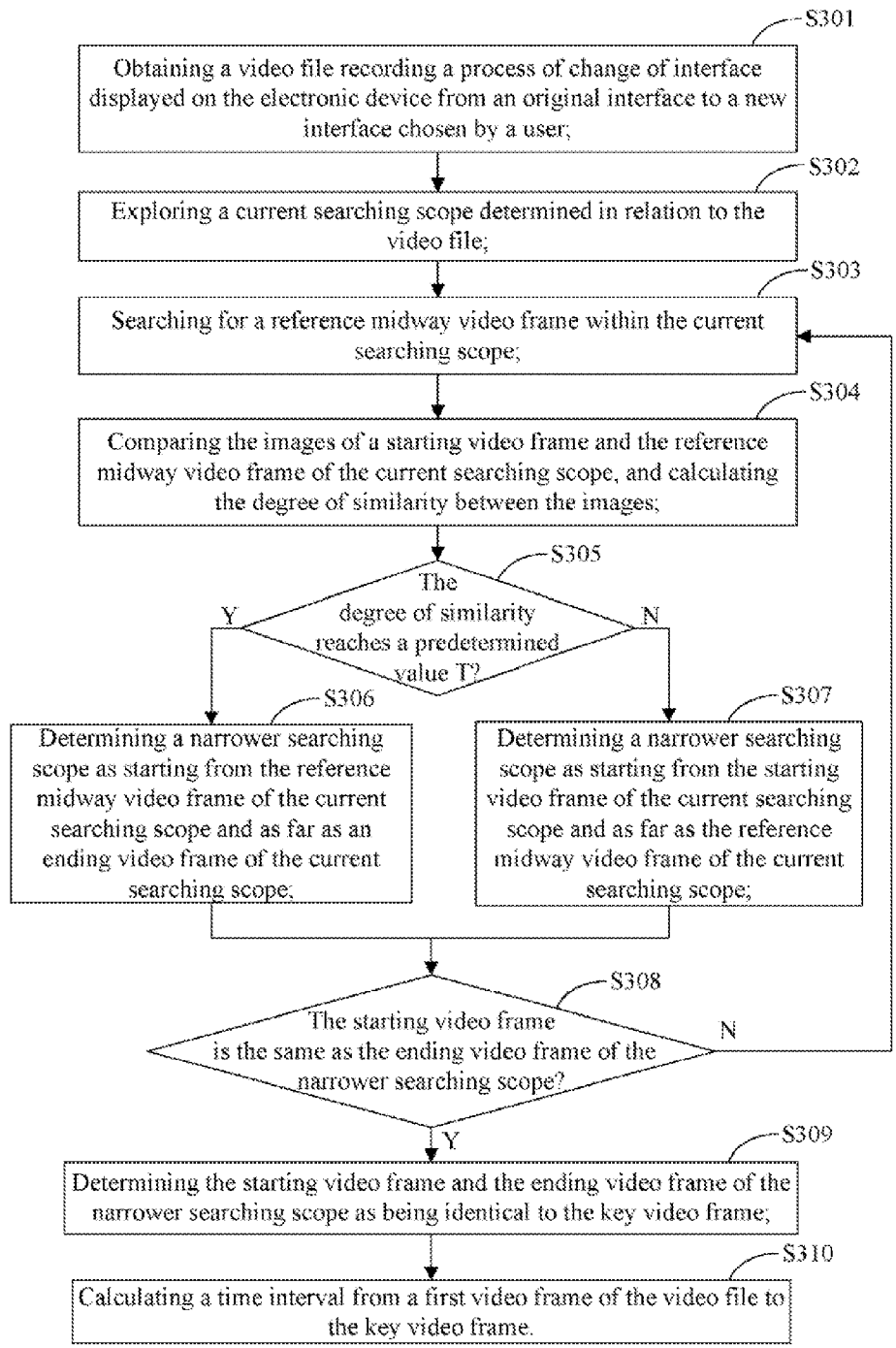
FIG. 3 is a flowchart illustrating a method for calculating response time of an electronic device.

FIG. 3 is a flowchart illustrating a method for calculating the response time of the electronic device.

In step S301, the measuring device 100 obtains a video file recording a process of change of interface displayed on the electronic device from an original interface to a new interface chosen by the user.

In step S302, the dichotomy searching module 31 explores a current searching scope determined in relation to the video file, according to an input dichotomy searching command.

In step S303, the dichotomy searching module 31 searches for a reference midway video frame within the current searching scope.

In step S304, the image comparing module 32 compares the images of the starting video frame Fa1 and the reference midway video frame Fc1 of the current searching scope, and calculates the degree of similarity between the images.

In step S305, the image comparing module 32 determines whether the degree of similarity reaches a predetermined value T. If the similar degree reaches the predetermined value T, the procedure goes to step S306, otherwise the procedure goes to step S307.

In step S306, the dichotomy searching module 31 determines the narrower searching scope as starting from the reference midway video frame Fc1 of the current searching scope and as far as the ending video frame Fn of the current searching scope, that is, the image comparing module 32 determines the reference midway video frame Fc1 of the current searching scope as being the starting video frame for the narrower searching scope, i.e. assigns the variable a1=c1, and thereby the narrower searching scope will be V1={Fc1, F(c1+1), . . . , Fn}, and the procedure goes to step S308.

In step S307, the dichotomy searching module 31 determines the narrower searching scope as starting from the starting video frame Fa1 of the current searching scope and as far as the reference midway video frame Fc1 of the current searching scope, that is, the image comparing module 32 determines the reference midway video frame Fc1 of the current searching scope as being the ending video frame for the narrower searching scope, i.e., assigns the second variable b1=c1, and thereby the narrower searching scope will be V1={F1, F2, . . . , Fc1}, and the procedure goes to step S308.

In step S308, the dichotomy searching module 31 determines whether the starting video frame of the narrower searching scope is the same as the ending video frame of the narrower searching scope, that is, the dichotomy searching module 31 determines whether the first variable a1 is equal to the second variable b1. If the starting video frame is the same as the ending video frame, i.e. b1−a1=0, the procedure goes to step S309, otherwise the image comparing module 32 determines the narrower searching scope as being the current searching scope, and the procedure goes back to step S302, until the condition b1−a1=0 is satisfied.

In step S309, the dichotomy searching module 31 determines the starting video frame Fa1 and the ending video frame Fb1 of the narrower searching scope as being identical to the key video frame.

In step S310, the time calculating module 33 calculates the time interval from the first video frame of the video file to the key video frame according to the timestamps of the first video frame and of the key video frame, and the display unit 10 displays the calculated time interval.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A measuring device for calculating response time of an electronic device, the measuring device comprising:
   a storage unit configured for storing a video file recording a process of change of interface displayed on the electronic device from an original interface to a new interface chosen by a user, wherein the video file comprises a series of video frames; and
   a processing unit coupled to the storage unit, the storage unit further storing one or more programs which, when executed by the processing unit, cause the processing unit to:
      determine a current searching scope comprising all the video frames of the video file;
      determine a reference midway video frame within the current searching scope;
      compare the images of a starting video frame and the reference midway video frame of the current searching scope, and calculate the degree of similarity between the images;
      determine a narrower searching scope within the current searching scope according to the degree of similarity, wherein if the degree of similarity reaches a predetermined value, the narrower searching scope is determined as starting from the reference midway video frame of the current searching scope and as far as an ending video frame of the current searching scope; if the similar degree does not reach the predetermined value, the narrower searching scope is determined as starting from the starting video frame of the current searching scope and as far as the reference midway video frame of the current searching scope;
      search for a key video frame within the narrower searching scope, wherein the image of the key video frame indicates the demarcation point between the original interface and the new interface displayed on the electronic device; and
      calculate a time interval from a first video frame of the video file to the key video frame, according to timestamps of the first video frame and of the key video frame, so as to determine the response time of the electronic device as the calculated time interval.

2. The measuring device as described in claim 1, wherein the processing unit further determines the starting video frame and the ending video frame of the narrower searching scope as the key video frame if the starting video frame is the same as the ending video frame in the narrower searching scope.

3. The measuring device as described in claim 1, further comprising a display unit configured for displaying the calculated time interval.

4. A method for calculating response time of an electronic device, the method comprising:
   obtaining a video file recording a process of change of interface displayed on the electronic device from an original interface to a new interface chosen by a user, wherein the video file comprises a series of video frames;
   determining a current searching scope comprising all the video frames of the video file;
   determining a reference midway video frame within the current searching scope;

comparing the images of a starting video frame and the reference midway video frame of the current searching scope, and calculating the degree of similarity between the images;

determining a narrower searching scope within the current searching scope according to the degree of similarity, wherein if the degree of similarity reaches a predetermined value, the narrower searching scope is determined as starting from the reference midway video frame of the current searching scope and as far as an ending video frame of the current searching scope; if the similar degree does not reach the predetermined value, the narrower searching scope is determined as starting from the starting video frame of the current searching scope and as far as the reference midway video frame of the current searching scope;

searching for a key video frame within the narrower searching scope, wherein the image of the key video frame indicates the demarcation point between the original interface and the new interface displayed on the electronic device; and calculating a time interval from a first video frame of the video file to the key video frame, according to timestamps of the first video frame and of the key video frame.

5. The method as described in claim 4, further comprising:

determining whether the starting video frame of the narrower searching scope is the same as the ending video frame of the narrower searching scope; and if the starting video frame of the narrower searching scope is not the same as the ending video frame of the narrower searching scope, determining the narrower searching scope as being the current searching scope, and continually determining a reference midway video frame within the current searching scope; or if the starting video frame of the narrower searching scope is the same as the ending video frame of the narrower searching scope, determining the starting video frame and the ending video frame of the narrower searching scope as being identical to the key video frame.

6. The method as described in claim 4, further comprising displaying the calculated time interval.

* * * * *